United States Patent
Mohr et al.

(10) Patent No.: US 11,718,302 B2
(45) Date of Patent: Aug. 8, 2023

(54) SYSTEM AND METHOD FOR INCREASING UPSHIFT ENGINE TORQUE

(71) Applicants: ZF Friedrichshafen AG, Friedrichshafen (DE); Honda Motor Co., Ltd., Tokyo (JP)

(72) Inventors: Frieder Mohr, Tettnang (DE); Christian Villing, Friedrichshafen (DE); Thomas Stark, Wasserburg (DE); Yoshitaka Shitani, Ann Arbor, MI (US); Matthew J. Tucker, Plain City, OH (US); Yasuhiro Gokan, Dublin, OH (US); Christopher Hopp, Dublin, OH (US); Ryuichi Mori, Utsunomiya (JP); Makoto Kobayashi, Utsunomiya (JP); Ryuji Murata, Utsunomiya (JP)

(73) Assignees: ZF FRIEDRICHSHAFEN AG, Friedrichshafen (DE); HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 17/097,260

(22) Filed: Nov. 13, 2020

(65) Prior Publication Data
US 2021/0146931 A1 May 20, 2021

Related U.S. Application Data

(60) Provisional application No. 62/935,757, filed on Nov. 15, 2019.

(51) Int. Cl.
*B60W 30/19* (2012.01)
*B60W 10/02* (2006.01)
(Continued)

(52) U.S. Cl.
CPC ............ *B60W 30/19* (2013.01); *B60W 10/02* (2013.01); *B60W 10/06* (2013.01); *B60W 10/11* (2013.01);
(Continued)

(58) Field of Classification Search
CPC ...... B60W 30/19; B60W 10/02; B60W 10/06; B60W 10/11; B60W 10/115; B60W 20/30;
(Continued)

(56) References Cited

U.S. PATENT DOCUMENTS

| 8,398,522 B2 | 3/2013 | Bauknecht et al. |
| 2005/0288153 A1 * | 12/2005 | Whitton ................ F16H 61/061 477/146 |

(Continued)

FOREIGN PATENT DOCUMENTS

| JP | 2007278415 A | * 10/2007 | ............. F16H 61/08 |

*Primary Examiner* — Tisha D Lewis
(74) *Attorney, Agent, or Firm* — Dority & Manning, P.A.

(57) ABSTRACT

A drive train control method includes transmitting a total time period of a stroke phase and a torque phase of an upshift from a transmission control unit of an automatic transmission to an engine control unit of an engine. The method also includes closing a first shift element of the automatic transmission and opening a second shift element of the automatic transmission during the upshift. A control pressure of the first shift element increases during the torque phase relative to the control pressure of the first shift element at an end of the stroke phase. A control pressure of the second shift element decreases during the torque phase relative to the control pressure of the second shift element at the end of the stroke phase. The method further includes, based at least in part on the total time period of the stroke and torque phases, increasing an actual torque of the engine during the upshift (Continued)

such that the actual torque of the engine increases to a higher gear torque prior to an end of the torque phase.

18 Claims, 3 Drawing Sheets

(51) Int. Cl.
B60W 10/06 (2006.01)
B60W 10/11 (2012.01)
F16H 61/00 (2006.01)
B60W 10/115 (2012.01)
B60W 20/30 (2016.01)

(52) U.S. Cl.
CPC ........... *F16H 61/00* (2013.01); *B60W 10/115* (2013.01); *B60W 20/30* (2013.01); *B60W 2510/0657* (2013.01); *B60W 2510/0695* (2013.01); *B60W 2510/107* (2013.01); *B60W 2510/1015* (2013.01); *B60W 2520/10* (2013.01); *B60W 2710/0666* (2013.01); *B60W 2710/1005* (2013.01); *F16H 2061/0075* (2013.01); *F16H 2200/0065* (2013.01); *F16H 2200/2012* (2013.01); *F16H 2200/2046* (2013.01); *F16H 2200/2094* (2013.01)

(58) Field of Classification Search
CPC . B60W 2510/0657; B60W 2510/0695; B60W 2510/1015; B60W 2510/107; B60W 2520/10; B60W 2710/0666; B60W 2710/1005; F16H 61/00; F16H 2061/0075; F16H 2200/0065; F16H 2200/2012; F16H 2200/2046; F16H 2200/2094; F16H 3/66; F16H 61/0437; F16H 63/502; F16H 59/40; F16H 61/686; F16H 2200/2064
See application file for complete search history.

(56) References Cited

U.S. PATENT DOCUMENTS

| | | | |
|---|---|---|---|
| 2007/0174000 A1* | 7/2007 | Chen | ................. F16H 61/061 701/51 |
| 2016/0223079 A1* | 8/2016 | Takahashi | ............... F16H 61/04 |
| 2018/0257633 A1* | 9/2018 | Meyer | ............... B60W 30/1846 |

* cited by examiner

FIG. 1

| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | X |

SYSTEM AND METHOD FOR INCREASING UPSHIFT ENGINE TORQUE

CROSS-REFERENCE TO RELATED APPLICATION

The present application is related and has right of priority to U.S. Provisional Patent Application No. 62/935,757 filed on Nov. 15, 2019, which is incorporated by reference in its entirety for all purposes.

FIELD OF THE INVENTION

The present subject matter relates generally to automatic transmissions, such as nine-speed automatic transmissions.

BACKGROUND OF THE INVENTION

Automatic transmissions generally include at least one planetary gear set and a plurality of shift elements. Transmission control systems selectively open and close the shift elements to adjust the gear ratio of the automatic transmission and shift the automatic transmission between its various gears. During upshifts, power flow within the automatic transmission changes from a lower gear to a higher gear.

Known methods for controlling upshifts in automatic transmissions have drawbacks. In particular, a vehicle frequently experiences significant undesirable longitudinal acceleration drops during an upshift torque phase. Thus, a control method for automatic transmissions that reduces longitudinal acceleration drop during the upshift torque phase would be welcome.

BRIEF DESCRIPTION OF THE INVENTION

Aspects and advantages of the invention will be set forth in part in the following description, or may be apparent from the description, or may be learned through practice of the invention.

In an example embodiment, a drive train control method includes transmitting a total time period of a stroke phase and a torque phase of an upshift from a transmission control unit of an automatic transmission to an engine control unit of an engine. The method also includes closing a first shift element of the automatic transmission and opening a second shift element of the automatic transmission during the upshift. A control pressure of the first shift element increases during the torque phase relative to the control pressure of the first shift element at an end of the stroke phase. A control pressure of the second shift element decreases during the torque phase relative to the control pressure of the second shift element at the end of the stroke phase. The method further includes, based at least in part on the total time period of the stroke and torque phases, increasing an actual torque of the engine during the upshift such that the actual torque of the engine increases to a higher gear torque prior to an end of the torque phase.

In a first example aspect, the first and second shift elements may be in a slip torque transmission state during the torque phase of the upshift.

In a second example aspect, the upshift may further include an inertia phase, and a speed of the engine may decrease during the inertia phase.

In a third example aspect, the first and second shift elements may be in a slipping torque transmission state during the torque phase of the upshift, the first shift element may be closed during the inertia phase of the upshift, and the second shift element is open during the inertia phase of the upshift.

In a fourth example aspect, the torque phase may immediately follow the stroke phase in the upshift, and/or the inertia phase may immediately follow the torque phase in the upshift.

In a fifth example aspect, a target torque of the engine may be increased during the torque phase.

In a sixth example aspect, the increasing of the target torque of the engine may begin prior to an end of the stroke phase.

In a seventh example aspect, the increasing of the target torque of the engine may begin after a time delay from a start of the upshift, and the time delay may be no less than one hundred and fifty milliseconds (150 ms) and no greater than four hundred milliseconds (400 ms).

In an eighth example aspect, the increasing of the target torque of the engine may begin about seventy milliseconds prior to the end of the stroke phase.

In a ninth example aspect, the torque phase may immediately follow the stroke phase in the upshift.

In a tenth example aspect, a longitudinal acceleration of a vehicle with the automatic transmission and the engine may be substantially constant during the upshift.

In an eleventh example aspect, the total time period of the stroke and torque phases is calculated by the transmission control unit based at least in part on one or more of a temperature of the automatic transmission, an input shaft speed of the automatic transmission, and a target torque of the engine.

In a twelfth example aspect, the total time period of the stroke and torque phases is one of a plurality of predetermined total time periods saved in a memory of the transmission control unit.

In a thirteenth example aspect, the one of the plurality of predetermined total time periods may be selected based at least in part on one or more of a temperature of the automatic transmission, an input shaft speed of the automatic transmission, and a target torque of the engine.

Each of the example aspects recited above may be combined with one or more of the other example aspects recited above in certain embodiments. For instance, all of the thirteen example aspects recited above may be combined with one another in some embodiments. As another example, any combination of two, three, four, five, or more of the thirteen example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

In another example embodiment, a control device for a drive train with an automatic transmission and an engine includes a transmission control unit of the automatic transmission, an engine control unit of the engine, and a communication bus. The transmission control unit is in communication with the engine control unit via the communication bus. The transmission and engine control units are configured to, during an upshift of the automatic transmission from a lower gear to a higher gear, transmit a total time period of a stroke phase and a torque phase of the upshift from the transmission control unit to the engine control unit. The transmission control unit is configured to close a first shift element of the automatic transmission and open a second shift element of the automatic transmission during the upshift. A control pressure of the first shift element increases during the torque phase relative to the control pressure of the first shift element at an end of the stroke phase. A control pressure of the second shift element decreases during the torque phase relative to the control pressure of the second shift element at the end of the stroke phase. The engine control unit is configured to, based at least in part on the total time period of the stroke and torque phases, increase an actual torque of the engine with the engine control unit during the upshift such that the actual torque of the engine increases to a higher gear torque prior to an end of the torque phase.

In an additional example embodiment, a drive train control method includes transmitting one or both of a time period of a stroke phase and a time period of a torque phase of an upshift from a transmission control unit of an automatic transmission to an engine control unit of an engine. The method also includes closing a first shift element of the automatic transmission and opening a second shift element of the automatic transmission during the upshift. A control pressure of the first shift element increases during the torque phase relative to the control pressure of the first shift element at an end of the stroke phase. A control pressure of the second shift element decreases during the torque phase relative to the control pressure of the second shift element at the end of the stroke phase. The method further includes, based at least in part on the one or both of the total time periods of the stroke and torque phases, increasing a target torque of the engine during the upshift such that an actual torque of the engine increases to a higher gear torque prior to an end of the torque phase.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
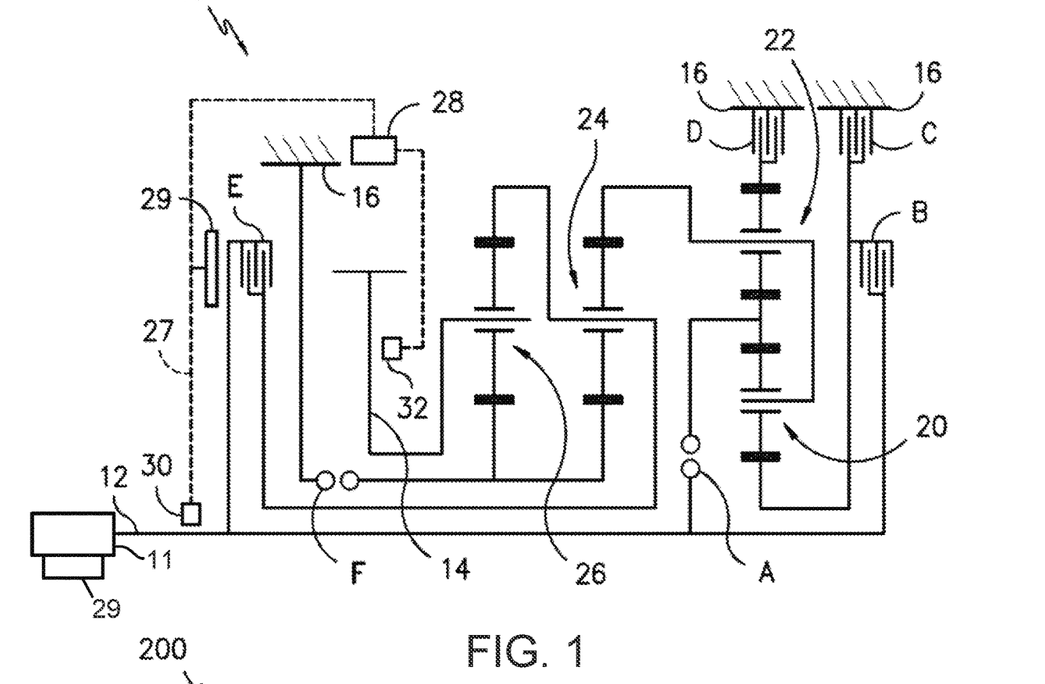
FIG. 1 is a schematic view of an automatic transmission according to an example embodiment of the present subject matter.

FIG. 1 is a schematic view of an automatic transmission 10 according to an example embodiment of the present subject matter. Automatic transmission 10 may be constructed or arranged in a similar manner to the automatic transmission described in U.S. Pat. No. 8,398,522 to Bauknecht et al., which is hereby incorporated by reference in its entirety for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10 in order to provide a suitable mechanical advantage to propel the associated vehicle.

As may be seen in FIG. 1, automatic transmission 10 includes an input shaft 12 and an output shaft 14. Input shaft 12 may be coupled to a turbine of a torque converter in order to link automatic transmission 10 to an engine 11 of an associated vehicle. Output shaft 14 may be coupled a front axle drive shaft of the associated vehicle. Automatic transmission 10 may change gears in order to adjust the gear ratio between the engine 11 and front axle drive shaft of the associated vehicle.

Automatic transmission 10 also includes four planetary gear sets: a first planetary gear set 20; a second planetary gear set 22; a third planetary gear set 24 and a fourth planetary gear set 26. In certain example embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the example embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the example embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component, such as a transmission housing 16.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples the transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may be non-volatile and represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Various components of automatic transmission 10 may be in communication with electronic control unit 28, e.g., via a suitable wiring harness 27. For example, electronic control unit 28 is in operative communication with shift element actuators (e.g., solenoid valves) of the shifting elements of automatic transmission 10. Thus, electronic control unit 28 may selectively adjust the shifting elements between the engaged configuration and the disengaged configuration, e.g., by selectively opening and closing the associated shift element actuators of the shifting elements. In such a manner, electronic control unit 28 may shift automatic transmission 10 between gears during operation of automatic transmission 10.

As a particular example, electronic control unit 28 is in operative communication with a solenoid valve 29 of multidisc clutch E. The wiring harness 27 (shown schematically with the dashed lines in FIG. 1) connects the electronic control unit 28 with the solenoid valve 29 to assist with forming a control loop for the multidisc clutch E. Electronic control unit 28 may adjust an electrical current supplied to solenoid valve 29 such that solenoid valve 29 selectively adjusts multidisc clutch E between a closed operating state and an open operating state. In the closed operating state, multidisc clutch E connects or couples input shaft 12 to the planet carrier of third planetary gear set 24 and the ring gear of fourth planetary gear set 26. In contrast, input shaft 12 is not coupled to the planet carrier of third planetary gear set 24 and the ring gear of fourth planetary gear set 26 by multidisc clutch E in the open operating state. While not shown in FIG. 1, the other shift elements of automatic transmission 10 may include similar shift element actuators or solenoid valves for adjusting the shift elements between the open and closed operating states.

In certain example embodiments, a flow rate of hydraulic fluid through solenoid valve 29 is proportional to the magnitude of the electrical current supplied to solenoid valve 29 by electronic control unit 28. Thus, electronic control unit 28 may adjust the magnitude of the electrical current supplied to solenoid valve 29 in order to adjust the flow rate of hydraulic fluid through solenoid valve 29 and set the control or closing pressure applied to multidisc clutch E. As a particular example, electronic control unit 28 may increase the magnitude of the electrical current supplied to solenoid valve 29 in order to increase the flow rate of hydraulic fluid through solenoid valve 29 and increase the closing pressure applied to multidisc clutch E by the hydraulic fluid. By setting the magnitude of the electrical current supplied to solenoid valve 29 to a slip operating state value, the solenoid valve 29 may adjust the multidisc clutch E to a slip operating state in which kinetic friction between the discs/plates of multidisc clutch E transfers torque from input shaft 12 to the planet carrier of third planetary gear set 24 and the ring gear of fourth planetary gear set 26. In contrast, static friction between the discs/plates of multidisc clutch E transfers torque from input shaft 12 to the planet carrier of third planetary gear set 24 and the ring gear of fourth planetary gear set 26 when solenoid valve 29 adjusts the multidisc clutch E to the closed operating state. Thus, solenoid valve 29 may adjust the closing pressure applied to multidisc clutch E such that multidisc clutch E is shiftable to states between the open and closed operating states.

Electronic control unit 28 may shift automatic transmission 10 between gears during operation of automatic transmission 10 based at least in part on signals from input speed sensor 30 and output speed sensor 32. Input speed sensor 30 is configured for measuring a speed, e.g., rotations per minute (RPM), of input shaft 12. Input speed sensor 30 may be positioned adjacent input shaft 12 or a turbine of an associated torque coupling. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

Figure 2:
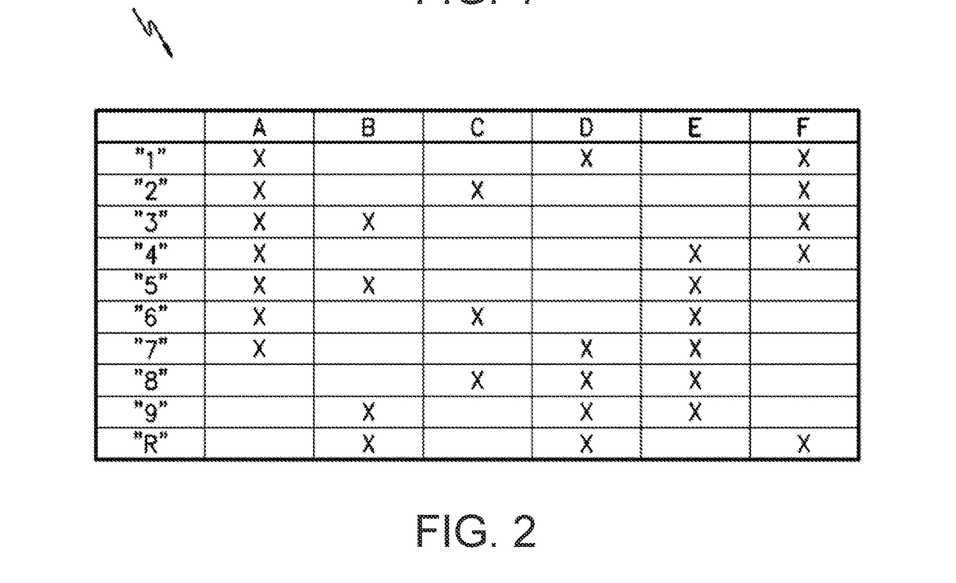
FIG. 2 is a table of an example shifting scheme as may be used with the example automatic transmission of FIG. 1.

FIG. 2 illustrates a table 200 of an example shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain example embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain example embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc. In addition, the present subject matter may be used in automatic transmissions with various driveline configurations, such as front-wheel drive, rear-wheel drive, all-wheel drive, etc.

Figure 3:
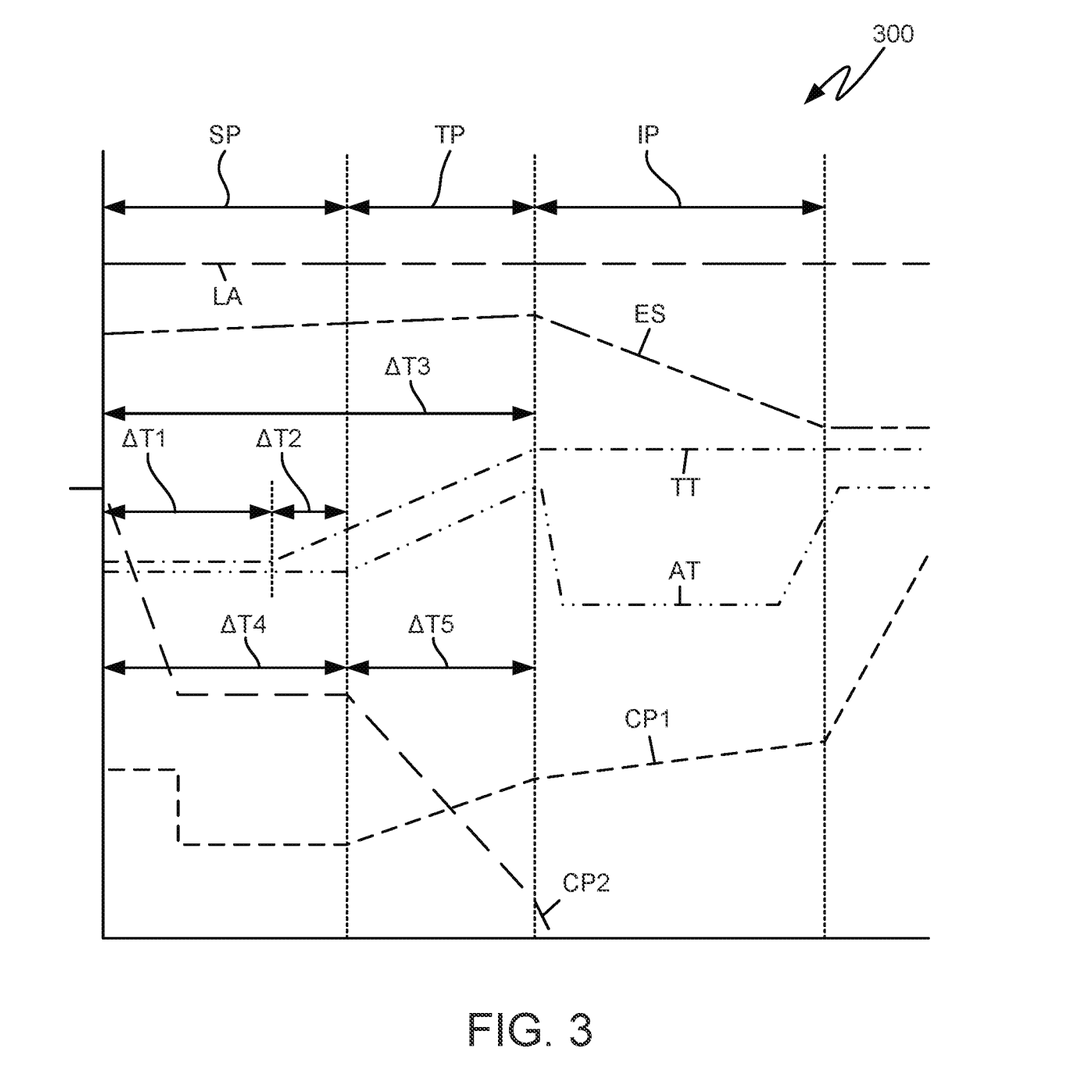
FIGS. 3 and 4 illustrate a method for operating an automatic transmission according to an example embodiment of the present subject matter.
Figure 4:
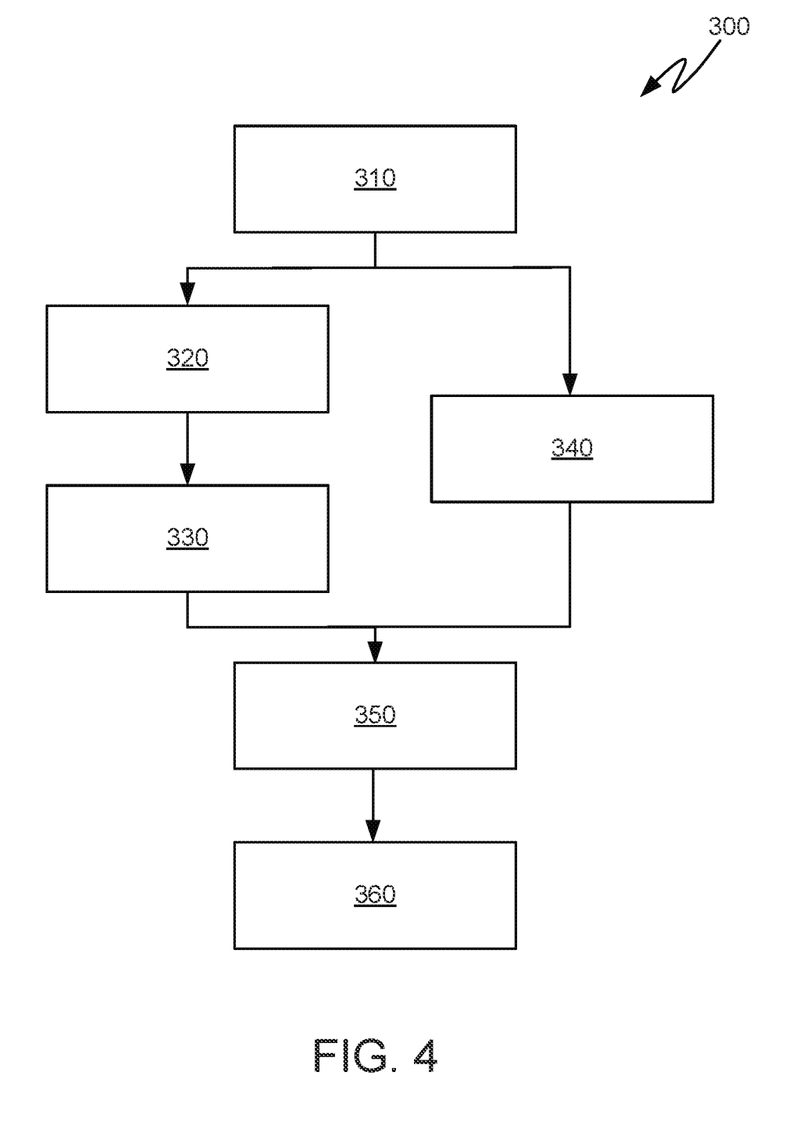

FIGS. 3 and 4 illustrate a method 300 for operating an automatic transmission according to an example embodiment of the present subject matter. Method 300 may be used to operate automatic transmission 10. Thus, method 300 is described in greater detail below in the context of automatic transmission 10. However, it will be understood that method 300 may be used with other suitable automatic transmissions in alternative embodiments as noted above. As discussed in greater detail below, method 300 includes features for reducing a magnitude of the longitudinal acceleration LA drop within a vehicle having automatic transmission 10 during a torque phase in an upshift of the automatic transmission 10. Method 300 may be performed during upshifts in which an accelerator pedal position is uniform or constant.

All or some of method 300 may be implemented by electronic control unit 28, e.g., the transmission control unit or TCU, and all or some of method 300 may be implemented by a separate electronic control unit 29 (FIG. 1) for engine 11, e.g., the engine control unit or ECU. In certain example embodiments, the transmission and engine control units may cooperate to implement method 300, and the separate control units for transmission 10 and engine 11 may communicate with each other via a communications bus, such as a controller area network (CAN bus) or another suitable interface. Thus, method 300 may be implemented with one, two, or more controllers, e.g., that each include one or more processors and memories.

With reference to FIG. 4, method 300 includes initiating an upshift in automatic transmission 10 from a lower gear to a higher gear at 310. For example, method 300 may be particularly advantageous during an upshift of automatic transmission 10 from the third gear "3" to the fourth gear "4". Method 300 is described in greater detail below in the context of an upshift of automatic transmission 10 from the third gear "3" to the fourth gear "4"; however, it will be understood that such description is provided by way of example only, and method may be used with any other suitable upshift in alternative example embodiments. During the upshift in automatic transmission 10 from the lower gear to the higher gear, a first shift element of automatic transmission 10 closes at 320, and a second shift element of automatic transmission 10 opens at 330. For example, during an upshift of automatic transmission 10 from the third gear "3" to the fourth gear "4", multidisc clutch E may be closed at 320, and multidisc clutch B may be opened at 330.

With reference to FIG. 3, a control pressure CP1 of the first shift element of automatic transmission 10 may be increased at 320 to assist with closing the first shift element. For example, the control pressure of multidisc clutch E may be increased in the manner shown in FIG. 3 for the first shift element at 320 during an upshift of automatic transmission 10 from the third gear "3" to the fourth gear "4". Conversely, a control pressure CP2 of the second shift element of automatic transmission 10 may be reduced at 330 to assist with opening the second shift element. For example, the control pressure of multidisc clutch B may be reduced in the manner shown in FIG. 3 for the second shift element at 330 during an upshift of automatic transmission 10 from the third gear "3" to the fourth gear "4".

The upshift in automatic transmission 10 from the lower gear to the higher gear at 310 may include various phases. For example, as shown in FIG. 3, the upshift may include a stroke phase SP, a torque phase TP, and an inertia phase IP. During the fill phase, the first shift element may be charged or filled with hydraulic fluid, and a piston of the first shift element may positioned against a clutch pack of the first shift element. As an example, a control solenoid for multidisc clutch E may first be opened to degree that a control pressure (e.g., corresponding to CP1 in FIG. 3) of hydraulic fluid applied to a piston of multidisc clutch E is set to a fast fill level and may then the control solenoid for multidisc clutch E may be subsequently adjusted such that the control pressure of hydraulic fluid applied to the piston of multidisc clutch E decreases to a stroke level. The magnitude of the fast fill level and the duration that the fast fill level is applied may assist with charging or filling the multidisc clutch E with hydraulic fluid, and the magnitude of the stroke level of hydraulic fluid and the duration that the stroke level is applied may assist with moving piston against the clutch pack of multidisc clutch E. As may be seen from the above, the stroke phase SP may correspond to portion of the upshift during which the first shift element is prepared for closing.

During the fill phase, the second shift element is also prepared for opening by reducing a control pressure CP2 of the second shift element. As an example, a control solenoid for multidisc clutch B may first be closed to degree that a control pressure (e.g., corresponding to CP2 in FIG. 3) of hydraulic fluid applied to a piston of multidisc clutch B is reduced from a closed level to an intermediate level. As may be seen from the above, the stroke phase SP may also correspond to portion of the upshift during which the second shift element is prepared for opening.

After, e.g., immediately after, the fill phase, the upshift enters the torque phase TP. During the torque phase TP, the control pressure CP1 of the first shift element is increased, and the control pressure CP2 of the second shift element is decreased. In particular, the control pressure CP1 of the first shift element increases during the torque phase TP relative to the control pressure CP1 of the first shift element at an end of the stroke phase SP. Conversely, the control pressure CP2 of the second shift element decreases during the torque phase TP relative to the control pressure CP2 of the second shift element at the end of the stroke phase SP. As may be seen from the above, a torque transfer capacity of the first shift element increases during the torque phase TP, and the torque transfer capacity of the second shift element decreases during the torque phase TP. Thus, the torque phase TP may correspond to portion of the upshift during which torque transfer capacity is shifted from the first shift element to the second shift element.

As an example, during the torque phase TP, the control solenoid for multidisc clutch E may adjusted to increase the control pressure of hydraulic fluid applied to the piston of multidisc clutch E with a slope that complements the transfer in torque capacity between multidisc clutches B, E. Similarly, during the torque phase TP, the control solenoid for multidisc clutch B may adjusted to decrease the control pressure of hydraulic fluid applied to the piston of multidisc clutch B with a slope that complements the transfer in torque capacity between multidisc clutches B, E. Thus, during an upshift of automatic transmission 10 from the third gear "3" to the fourth gear "4", the torque transfer capacity of multidisc clutches B, E may be adjusted such that multidisc clutch E is partially closed to at least a slip operating state for transferring torque between input shaft 12 and the sun gear of first planetary gear set 20 and such that multidisc clutch B is opened to effectively terminate torque transfer between input shaft 12 and the planet carrier of third planetary gear set 24 along with the ring gear of fourth planetary gear set 26. Thus, first and second shift elements may be in a slip torque transmission state during at least a portion of the torque phase TP of the upshift.

During the torque phase TP of the upshift, the first shift element is at least partially closed and the second shift element is at least partially opened. After, e.g., immediately after, the torque phase TP, the upshift enters the inertia phase IP. During the inertia phase IP, the control pressure CP1 of the first shift element is further increased, and the control pressure CP2 of the second shift element is further decreased, e.g., to minimal or zero value. In particular, the control pressure CP1 of the first shift element increases during the inertia phase IP relative to the control pressure CP1 of the first shift element at an end of the torque phase TP. Conversely, the control pressure CP2 of the second shift element decreases to a minimal or zero value. As may be seen from the above, a torque transfer capacity of the first shift element increases to a complete closing of the first shift element, and the torque transfer capacity of the second shift element decreases to a complete opening of the second shift element during the inertia phase IP. Thus, the inertia phase IP may correspond to portion of the upshift during which the first shift element is completely opened and the second shift element is completely closed.

As an example, during the inertia phase IP, the control solenoid for multidisc clutch E may adjusted to increase the control pressure of hydraulic fluid applied to the piston of multidisc clutch E with a slope that completes the closing of multidisc clutch E such that kinetic friction between the discs/plates of multidisc clutch E terminates and static friction between the discs/plates of multidisc clutch E couples input shaft 12 and the sun gear of first planetary gear set 20. Conversely, during the inertia phase IP, the control solenoid for multidisc clutch B may be closed to stop the flow of hydraulic control fluid to multidisc clutch B and finish opening multidisc clutch B. Thus, during an upshift of automatic transmission 10 from the third gear "3" to the fourth gear "4", multidisc clutch E is completely closed, and multidisc clutch B is completely opened.

As noted above, method 300 includes features for reducing longitudinal acceleration LA within a vehicle having automatic transmission 10 during an upshift of the automatic transmission 10. For example, as shown in FIG. 3, the longitudinal acceleration LA within the vehicle having automatic transmission 10 may be substantially constant during the upshift of the automatic transmission 10 when an accelerator pedal position is also uniform. As used herein, the term "about," means a variation of less than five percent (5%) when used in the context of accelerations. A ride comfort of the vehicle may be improved using method 300 due to the substantially constant longitudinal acceleration LA.

At 340, electronic control unit 28 transmits a total time period of the stroke and torque phases (SP+TP or ΔT3) of the upshift to electronic control unit 29. The total time period of the stroke and torque phases ΔT3 may be predetermined during calibration or testing of automatic transmission 10. For example, a manufacturer of automatic transmission 10 may determine a value for the total time period of the stroke and torque phases ΔT3 for each upshift of automatic transmission 10 at various operation points, and the value for the total time period of the stroke and torque phases ΔT3 may be saved in a memory of electronic control unit 28. As another example, the manufacturer of automatic transmission 10 may establish a formula for calculating the total time period of the stroke and torque phases ΔT3 at various operation points during calibration or testing of automatic transmission 10. The various operation points may include one or more or a temperature of automatic transmission 10 (e.g., transmission fluid within automatic transmission 10) from a temperature sensor of automatic transmission 10, a speed of input shaft 12 from input speed sensor 30, a speed of output shaft 14 from output speed sensor 32, a target torque for engine 11, etc. During method 300, the current operation points for automatic transmission 10 may be measured or determined, and the value for the value for the total time period of the stroke and torque phases ΔT3 associated with the current operation points may be calculated using a suitable formula, pulled from a look-up table, etc.

In certain example embodiments, the total time period of the stroke and torque phases ΔT3 for the upshift may be one of a plurality of predetermined total time periods saved in the memory of electronic control unit 28. Each of the plurality of predetermined total time periods may be associated with one or more operation points of automatic transmission 10. Similarly, when the total time period of the stroke and torque phases ΔT3 is calculated from a predetermined formula, the calculated total time period of the stroke and torque phases ΔT3 may vary based upon the one or more operation points of automatic transmission 10. For example, when automatic transmission 10 is relatively hot, the predetermined or calculated total time period of the stroke and torque phases ΔT3 may be less than the predetermined or calculated total time period of the stroke and torque phases ΔT3 when automatic transmission 10 is relatively cold, e.g., due to a decreased viscosity of transmission fluid in automatic transmission 10. Conversely, when automatic transmission 10 is relatively cold, the predetermined or calculated total time period of the stroke and torque phases ΔT3 may be greater than the predetermined or calculated total time period of the stroke and torque phases ΔT3 when automatic transmission 10 is relatively hot, e.g., due to an increased viscosity of transmission fluid in automatic transmission 10. As another example, when the speed of input shaft 12 is relatively high, the predetermined or calculated total time period of the stroke and torque phases ΔT3 may be less than the predetermined or calculated total time period of the stroke and torque phases ΔT3 when the speed of input shaft 12 is relatively low, e.g., due to a decreased capacity of a transmission fluid pump. Conversely, when the speed of input shaft 12 is relatively low, the predetermined or calculated total time period of the stroke and torque phases ΔT3 may be greater than the predetermined or calculated total time period of the stroke and torque phases ΔT3 when the speed of input shaft 12 is relatively high, e.g., due to an increased capacity of the transmission fluid pump. Other operation points of automatic transmission 10 may have similar correlations for the predetermined or calculated total time period of the stroke and torque phases ΔT3.

As may be seen from the above, the total time period of the stroke and torque phases ΔT3 for the upshift may vary depending upon current operating conditions of automatic transmission 10, and total time periods of the stroke and torque phases ΔT3 for upshifts at various operating conditions of automatic transmission 10 may stored within the memory of electronic control unit 28 or may be calculated by electronic control unit 28 using a formula stored in the memory of electronic control unit 28. The total time period of the stroke and torque phases ΔT3 for the upshift at 310 is calculated or pulled from the memory of electronic control unit 28 based on the current operating conditions of automatic transmission 10.

Electronic control unit 28 may transmit the total time period of the stroke and torque phases ΔT3 of the upshift to electronic control unit 29 at a suitable time, e.g., during the upshift of automatic transmission 10 from the lower gear to the higher gear, prior to the upshift at 310, etc. Method 300 may include transmitting the total time period of the stroke and torque phases ΔT3 of the upshift to electronic control unit 29 at a time that allows electronic control unit 29 sufficient time to adjust operation of engine 11 in the manner described below during method 300.

In alternative example embodiments, the time period of the stroke phase SP (shown as ΔT4 in FIG. 3) and/or the time period of the torque phase TP (shown as ΔT5 in FIG. 3) as may be transmitted from electronic control unit 28 to electronic control unit 29 in lieu or in addition to the total time period of the stroke and torque phases ΔT3 at 310. Such values may also vary depending upon current operating conditions of automatic transmission 10, and may be calculated with suitable formulas or be predetermined and pulled from look-up tables, etc. in the same or similar manner to that described above for the total time period of the stroke and torque phases ΔT3. In such example embodiments, the time period of the stroke phase SP and/or the time period of the torque phase TP may also be used in the same or similar manner to that described below for the total time period of the stroke and torque phases ΔT3.

The total time period of the stroke and torque phases ΔT3 for the upshift may be used by electronic control unit 28 to control operation of the first and second shifting elements during 320 and 330. By sending the total time period of the stroke and torque phases ΔT3 for the upshift from electronic control unit 28 of automatic transmission 10 to electronic control unit 28 of motor 11, the total time period of the stroke and torque phases ΔT3 for the upshift may also be used by electronic control unit 29 to control operation of motor 11 during the upshift. For example, at 350, based at least in part on the total time period of the stroke and torque phases ΔT3 for the upshift, an actual torque AT of engine 11 may be increased, e.g., by electronic control unit 29, during the upshift such that the actual torque AT of engine 11 increases to a higher gear torque, e.g., a predetermined actual torque for motor 11 at the higher gear, prior to an end of the torque phase TP.

By increasing the actual torque AT of engine 11 in such a manner at 350, the longitudinal acceleration LA within the vehicle having automatic transmission 10 may be substantially constant during the upshift of the automatic transmission 10. Conversely, in known transmissions, the actual torque is constant during an inertia phase, and the longitudinal acceleration significantly decreases during a torque phase. In particular, a magnitude of the longitudinal acceleration in the higher gear in the known transmissions may result from the actual engine torque for the lower gear rather than the higher gear. Conversely, by increasing the actual torque AT of engine 11 during the upshift such that the actual torque AT of engine 11 increases to the higher gear torque prior to the end of the torque phase TP, the actual torque AT of engine 11 for the higher gear is in place prior to the inertia phase IP, and the longitudinal acceleration LA within the vehicle having automatic transmission 10 may be substantially constant during the inertia phase IP.

To assist with implementing the actual torque AT during the upshift at 350, a target torque TT of engine 11 is increased at 360, e.g., prior to an end of the stroke phase SP and/or during the torque phase TP of the upshift. By increasing the target torque TT of engine 11 at such time, the longitudinal acceleration LA within the vehicle having automatic transmission 10 may be substantially constant during the upshift of the automatic transmission 10, e.g., due to the actual torque AT of engine 11 for the higher gear being in place prior to the inertia phase IP.

As an example, the target torque TT of engine 11 may be increased after a calibrateable delay time, ΔT1, from a start of the upshift. In particular, the target torque TT of engine 11 may be increased at 360 after the time delay ΔT1 from a start of the stroke phase SP. In certain example embodiments, the time delay may be no less than zero milliseconds (0 ms) and no greater than six hundred milliseconds (600 ms). In particular example embodiments, the time delay may be no less than one hundred and fifty milliseconds (150 ms) and no greater than four hundred milliseconds (400 ms). The above recited time delays may advantageously assist with providing substantially constant longitudinal acceleration LA, as described above, by increasing the target torque TT of engine 11 at a suitable time during the upshift. It will be understood that the particular time delay ΔT1 selected for an upshift may depend upon several variables, such as shift element size, engine torque delay, etc.

Method 300 may also include increasing the actual torque AT of engine 11 after a calibrateable delay time, ΔT2, from 360. The increase in the actual torque AT of engine 11 may be completed before the ratio change from the lower gear to the higher gear and/or prior to an engine speed ES decreasing during the inertia phase IP. As an alternative example embodiment, the target torque TT may begin increasing by the calibrateable delay time ΔT2 earlier than the end of the stroke phase SP and/or the start of torque phase TP. The actual torque AT may have a delay from the target torque TT increase, and the subsequent increase of the actual torque AT may be matched with the end of the stroke phase SP and/or the start of torque phase TP using the calibrateable delay time ΔT2.

As a particular example, the delay time ΔT2 may be about seventy milliseconds (70 ms). The above recited time delay time may advantageously assist with providing substantially constant longitudinal acceleration LA, as described above, by increasing the actual torque AT of engine 11 at a suitable time during the upshift. As may be seen from the above, the delay time ΔT2 may assist with accounting for an actual engine torque response delay. The delay time ΔT2 may be calibrated based on engine operation conditions, such as speed, torque, temperature, etc., e.g., such that a start of the actual torque AT increase corresponds to a start of the torque phase TP.

Method 300 may also include increasing the actual torque AT of engine 11 at the end of the stroke phase SP. Thus, increasing the target torque TT of engine 11 at 360 may begin about seventy milliseconds (70 ms) prior to the end of the stroke phase SP. As used herein, the term "about" means within ten milliseconds (10 ms) of the stated time interval when used in the context of time intervals.

As may be seen in FIG. 3, the actual torque AT of engine 11 may increase from the end of the stroke phase SP and during the torque phase TP. In particular, the actual torque AT of engine 11 may increase to an actual torque AT for the higher gear during the torque phase TP. During the inertia phase IP, the actual torque AT of engine 11 also decreases from the actual torque AT of engine 11 at an end of the torque phase TP and then increases to the actual torque AT for the higher gear of engine 11. A speed ES of engine 11 may also decrease during the inertia phase IP, e.g., as power flow within transmission 10 changes from the lower gear to the higher gear.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drive train control method, comprising:
   transmitting a total time period of a stroke phase and a torque phase of an upshift from a transmission control unit of an automatic transmission to an engine control unit of an engine;
   closing a first shift element of the automatic transmission during the upshift, a control pressure of the first shift element increasing during the torque phase relative to the control pressure of the first shift element at an end of the stroke phase;
   opening a second shift element of the automatic transmission during the upshift, a control pressure of the second shift element decreasing during the torque phase relative to the control pressure of the second shift element at the end of the stroke phase;
   increasing a target torque of the engine during the torque phase, the target torque of the engine begins increasing prior to an end of the stroke phase; and
   based at least in part on the total time period of the stroke and torque phases, increasing an actual torque of the engine during the upshift such that the actual torque of the engine increases to a higher gear torque prior to an end of the torque phase.

2. The drive train control method of claim 1, wherein the first and second shift elements are in a slip torque transmission state during the torque phase of the upshift.

3. The drive train control method of claim 1, wherein the upshift further comprises an inertia phase, and a speed of the engine decreases during the inertia phase.

4. The drive train control method of claim 3, wherein the first and second shift elements are in a slipping torque transmission state during the torque phase of the upshift, the first shift element is closed during the inertia phase of the upshift, and the second shift element is open during the inertia phase of the upshift.

5. The drive train control method of claim 3, wherein the torque phase immediately follows the stroke phase in the upshift, and the inertia phase immediately follows the torque phase in the upshift.

6. The drive train control method of claim 1, wherein increasing the target torque of the engine begins after a time delay from a start of the upshift, and the time delay is no less than one hundred and fifty milliseconds and no greater than four hundred milliseconds.

7. The drive train control method of claim 1, wherein increasing the target torque of the engine begins about seventy milliseconds prior to the end of the stroke phase.

8. The drive train control method of claim 1, wherein the torque phase immediately follows the stroke phase in the upshift.

9. The drive train control method of claim 1, wherein a longitudinal acceleration of a vehicle with the automatic transmission and the engine is substantially constant during the upshift.

10. The drive train control method of claim 1, wherein the total time period of the stroke and torque phases is calculated by the transmission control unit based at least in part on one or more of a temperature of the automatic transmission, an input shaft speed of the automatic transmission, and a target torque of the engine.

11. The drive train control method of claim 1, wherein the total time period of the stroke and torque phases is one of a plurality of predetermined total time periods saved in a memory of the transmission control unit.

12. The drive train control method of claim 11, further comprising selecting the one of the plurality of predetermined total time periods based at least in part on one or more of a temperature of the automatic transmission, an input shaft speed of the automatic transmission, and a target torque of the engine.

13. A control system for a drive train with an automatic transmission and an engine, comprising:
   a transmission control unit of the automatic transmission;
   an engine control unit of the engine; and
   a communication bus, the transmission control unit in communication with the engine control unit via the communication bus;
   wherein the transmission and engine control units are configured to transmit a total time period of a stroke phase and a torque phase of an upshift from the transmission control unit to the engine control unit,
   wherein the transmission control unit is configured to close a first shift element of the automatic transmission and open a second shift element of the automatic transmission during the upshift, a control pressure of the first shift element increasing during the torque phase relative to the control pressure of the first shift element at an end of the stroke phase, a control pressure of the second shift element decreasing during the torque phase relative to the control pressure of the second shift element at the end of the stroke phase,
   wherein the engine control unit is further configured to increase a target torque of the engine during the torque phase, the engine control unit configured to start increasing the target torque of the engine after a time delay from a start of the upshift, the time delay being no less than one hundred and fifty milliseconds and no greater than four hundred milliseconds, and wherein the engine control unit is configured to, based at least in part on the total time period of the stroke and torque phases, increase an actual torque of the engine with the engine control unit during the upshift such that the actual torque of the engine increases to a higher gear torque prior to an end of the torque phase.

14. The control system of claim 13, wherein the total time period of the stroke and torque phases is calculated by the transmission control unit based at least in part on one or more of a temperature of the automatic transmission, an input shaft speed of the automatic transmission, and a target torque of the engine.

15. The control system of claim 13, wherein the total time period is a one of a plurality of predetermined total time periods saved in a memory of the transmission control unit, and the transmission control unit is further configured to select the one of the plurality of predetermined total time periods based at least in part on one or more of a temperature of the automatic transmission, an input shaft speed of the automatic transmission, and a target torque of the engine.

16. A drive train control method, comprising:

transmitting one or both of a time period of a stroke phase of an upshift and a time period of a torque phase of the upshift from a transmission control unit of an automatic transmission to an engine control unit of an engine;

closing a first shift element of the automatic transmission during the upshift, a control pressure of the first shift element increasing during the torque phase relative to the control pressure of the first shift element at an end of the stroke phase;

opening a second shift element of the automatic transmission during the upshift, a control pressure of the second shift element decreasing during the torque phase relative to the control pressure of the second shift element at the end of the stroke phase; and based at least in part on the one or both of the time periods of the stroke and torque phases, increasing a target torque of the engine during the upshift such that an actual torque of the engine increases to a higher gear torque prior to an end of the torque phase, wherein the target torque of the engine begins increasing prior to an end of the stroke phase.

17. The drive train control method of claim 16, wherein increasing the target torque of the engine begins after a time delay from a start of the upshift, and the time delay is no less than one hundred and fifty milliseconds and no greater than four hundred milliseconds.

18. The drive train control method of claim 16, wherein increasing the target torque of the engine begins about seventy milliseconds prior to the end of the stroke phase.

* * * * *